United States Patent [19]

Franks

[11] 4,286,486
[45] Sep. 1, 1981

[54] FIN COLLECTION AND TRANSPORT APPARATUS

[75] Inventor: Lawrence A. Franks, Sturgis, Mich.

[73] Assignee: Burr Oak Tool & Gauge Company, Sturgis, Mich.

[21] Appl. No.: 78,363

[22] Filed: Sep. 24, 1979

Related U.S. Application Data

[62] Division of Ser. No. 905,022, May 11, 1978, Pat. No. 4,195,540.

[51] Int. Cl.³ .................... B65H 35/06; B23Q 7/16; B26D 7/06
[52] U.S. Cl. ............................... 83/23; 83/29; 83/95; 83/100; 83/155.1; 198/422; 198/692; 414/47; 29/157.3 R
[58] Field of Search ............... 83/23, 29, 90, 95, 169, 83/155.5, 100, 84, 86; 29/157.3 R, 157.3 A, 157.3 AH; 198/422, 692; 414/47

[56] References Cited

U.S. PATENT DOCUMENTS

| Re. 27,577 | 2/1973 | Rawlings et al. ...................... 83/95 |
| 3,101,638 | 8/1963 | Rhicard et al. ........................ 83/95 |
| 3,512,436 | 5/1970 | Neuber ................................. 83/100 |
| 3,555,977 | 1/1971 | Saumsiegle .......................... 83/95 X |
| 3,986,417 | 10/1976 | Anderson et al. ..................... 83/23 |
| 4,048,888 | 9/1977 | Bonnard et al. ................... 83/100 X |
| 4,108,031 | 8/1978 | Dangelmaier et al. .............. 83/95 X |
| 4,230,004 | 10/1980 | Jonson ................................. 83/23 |

Primary Examiner—Donald R. Schran
Attorney, Agent, or Firm—Blanchard, Flynn, Thiel, Boutell & Tanis

[57] ABSTRACT

An apparatus for producing, collecting and transporting platelike fins, including fin forming apparatus for simultaneously forming plural fins in adjacent side-by-side relationship from sheet material. The forming apparatus causes the fins to be discharged outwardly in the lengthwise direction thereof. Fin handling are positioned adjacent the forming apparatus for collecting and transporting the fins. The fin handling apparatus includes an endless conveyor having a substantially straight upper reach positioned adjacent the forming apparatus and movable substantially transverse to the direction of movement of the fins as discharged from the forming apparatus. A plurality of elongated fin collectors are fixed to the endless conveyor, being spaced a predetermined distance apart throughout the lengthwise direction of the conveyor, the predetermined distance being equal to the centerline-to-centerline distance between adjacent fins as discharged from the forming apparatus. The collectors projecting outwardly in substantially transverse relationship to the endless conveyor for permitting a plurality of fins to be collected thereon in stacked relationship.

2 Claims, 14 Drawing Figures

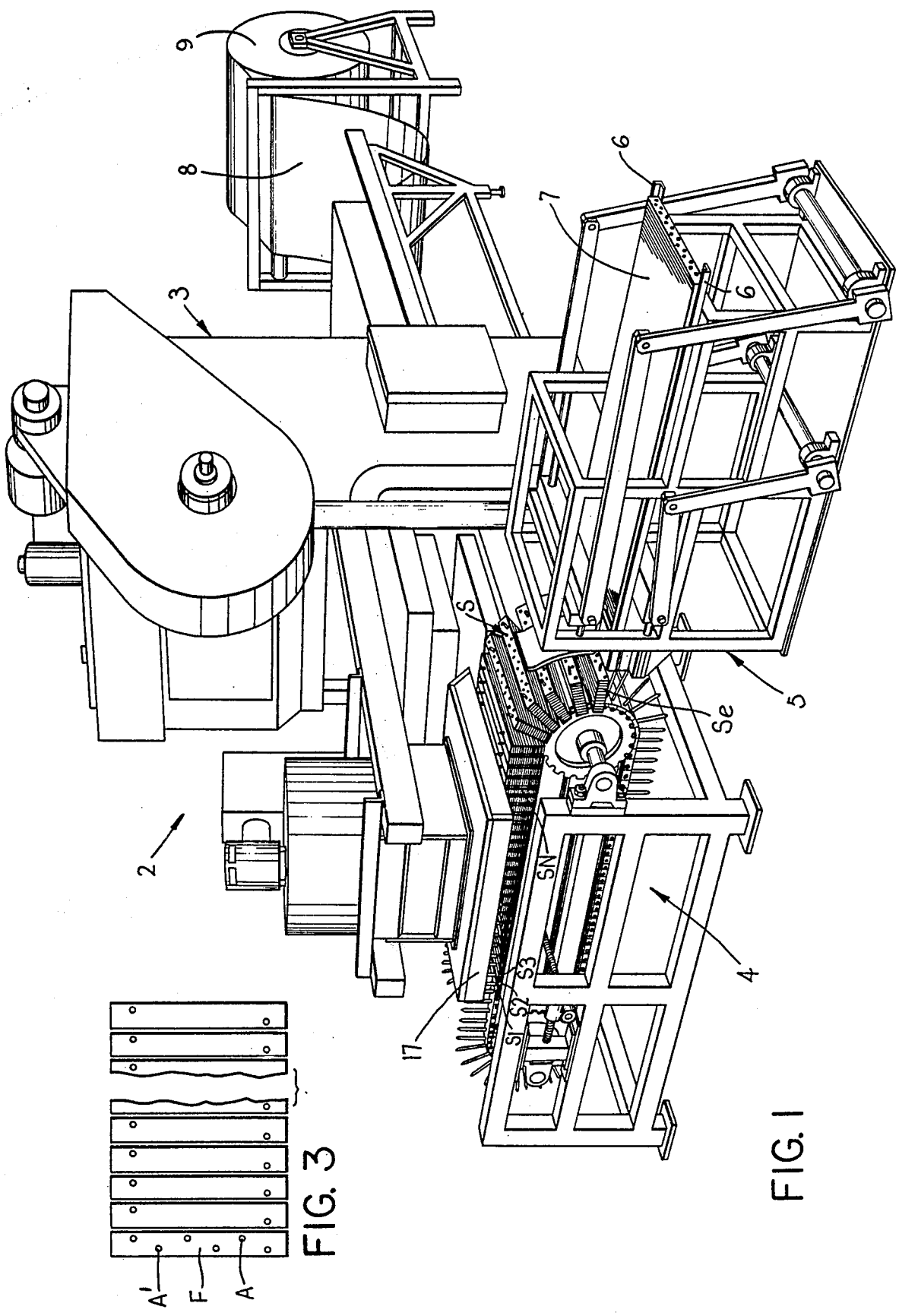

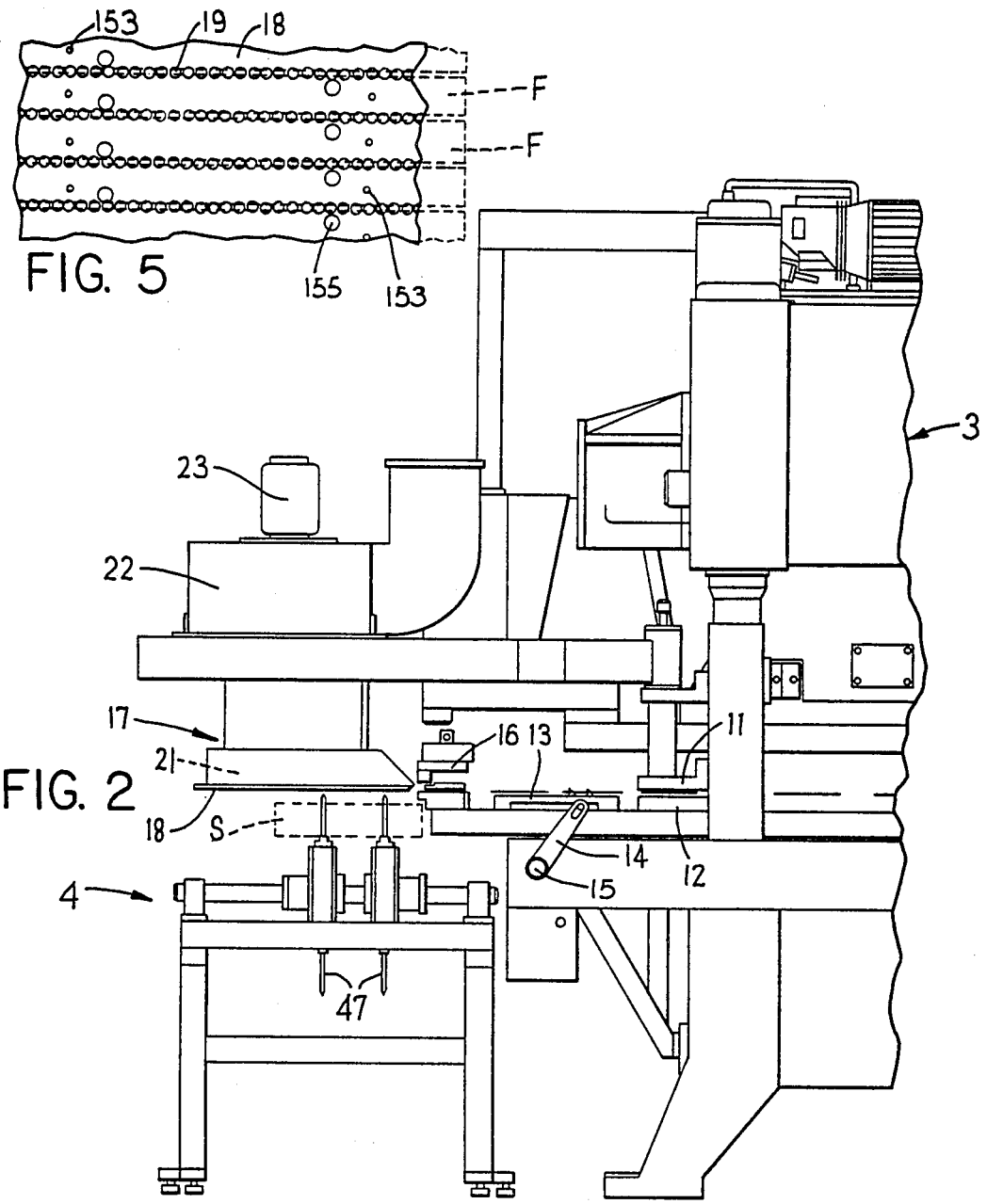
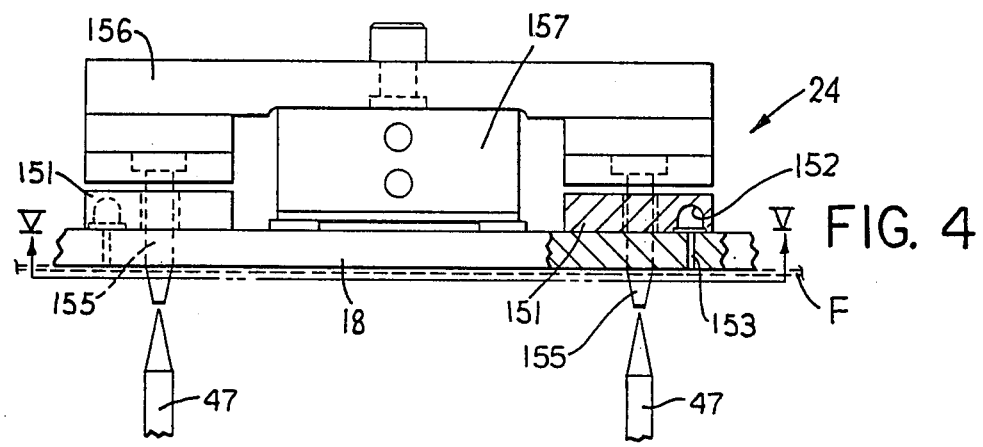

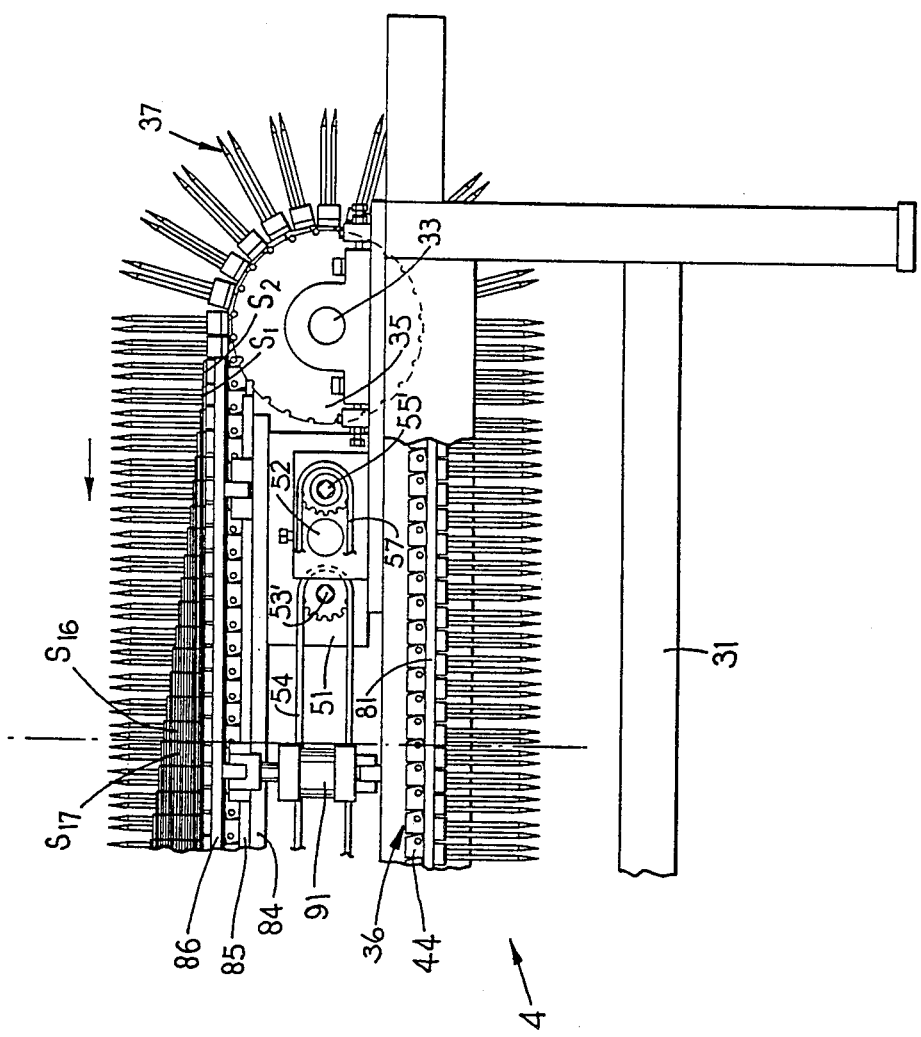

FIN COLLECTION AND TRANSPORT APPARATUS

This is a division of application Ser. No. 905,022, filed May 11, 1978, now U.S. Pat. No. 4,195,540.

FIELD OF THE INVENTION

This invention relates to an improved apparatus and method for collecting and transporting platelike fins, such as for heat exchangers, wherein the fins are received from a conventional fin line apparatus and are collected in determined stacks, with said stacks being transported to and discharged into a chute.

BACKGROUND OF THE INVENTION

Fins of the type used for attachment to heat exchanger tubes, such as used in heating, air conditioning, and heat exchange equipment, are conventionally formed on a ribbon-type fin line apparatus. This apparatus acts on a sheet of suitable material such as sheet metal to simultaneously form a plurality of platelike fins during each cycle of operation. In addition to severing the fins from the sheet stock, the apparatus also simultaneously forms several holes through each fin so that they can be positioned in surrounding relationship to appropriate heat exchanger tubes.

While this known fin line apparatus is able to produce fins at a relatively high rate, nevertheless, the handling of the fins, and specifically the collecting of the fins and the transporting thereof to a further work station has long presented a problem to users of this equipment. Most heat exchanger manufacturers utilizing fin forming equipment of the above type position a spiked fin-stacking rack adjacent the apparatus so that the fins, when discharged from the press, are collected on the rack. The fins collect in vertical stacks until the rack is filled, whereupon it is then necessary to shut down the fin line apparatus and the filled rack is then removed.

In an attempt to improve the efficiency of this operation, some fin line apparatus have provided a rotary table or shuttle with a plurality of fin receiving racks thereon so that when one rack is filled, it can be removed and an empty rack moved into the fin receiving position. This operation, while it minimizes the shutdown time of the apparatus, nevertheless still requires shutdown of the apparatus for a substantial time.

When utilizing spiked racks as described above, the spikes are normally of substantial height to permit formation thereon of a fin stack of maximum height. This, however, creates additional problems in that it has been discovered that the large vertical stacks can cause deflection of the spikes so that the upper ends do not properly align with the discharge of the press. Hence, proper feeding of fins onto the spikes may be difficult, possibly fouling the stacking operation and requiring a shutdown of the overall assembly.

The use of these known spiked racks for stacking fins also requires substantial manual manipulation and effort inasmuch as the fins, when collected in stacks on the rack, are normally manually removed from the racks for supply to a further processing station.

While other devices have been devised which have attempted to provide for automated collecting and transporting of fins, nevertheless these other devices have primarily related to machines of the fin-per-stroke type which normally produce only a single fin during each cycle, or at best only a small number of fins per stroke since the fins are moved in a direction perpendicular to their lengthwise extent. This type of machine has a very limited rate of production, particularly when compared with a multi-progression ribbon-type fin line apparatus which can produce a large number of fins (such as thirty-two) during each cycle. The fin-per-stroke machine is thus totally undesirable where the efficient mass producing and handling of fins is required.

Accordingly, it is an object of this invention to provide an improved apparatus and method for collecting and stacking the fins as formed on a fin forming apparatus, and then transporting the fins to a further work location, which apparatus and method overcome the abovementioned disadvantages.

More specifically, it is an object to provide an improved apparatus, as aforesaid, employing an endless fin collector extending between the fin forming apparatus and a selected loaction, which collector permits the fins to be collected and stacked thereon, and then automatically transported to said selected location for discharge. The endless collector includes an endless conveyor member movable transversely of the ribbon-type fin forming apparatus so that the newly formed fins are sequentially vertically stacked on the conveyor member due to the movement thereof below the apparatus. When the conveyor member leaves the region below the fin forming apparatus, it contains thereon adjacent stacks each containing a predetermined number of fins. This endless collector thus permits efficient and automatic collection of fins in vertical stacks each containing a predetermined number of fins, which is a function of the number of fins produced in side-by-side relationship during each operation, with the stacks being automatically transported to and discharged from the collector at a selected location.

A further object is to provide an apparatus, as aforesaid, wherein the endless conveyor member is formed by a plurality of adjacent fin receiving devices each formed by a bottom fin support and having outwardly projecting fin supporting structure, such as two or more outwardly projecting spikes adapted to project through openings formed in the fins, to securely and accurately receive and vertically stack the fins as they are discharged from the fin forming machine, so that the stacks can be securely and safely transported to a discharge location.

Still a further object is to provide an improved apparatus, as aforesaid, which includes a removing structure in association with the endless collector for enabling the stacks of fins to be sequentially and automatically removed from the endless conveyor member at the discharge location, with the removal of the stacks being synchronized with the receiving of the fins on the endless collector from the fin forming machine, so as to provide for totally automatic collecting, transporting and discharging of the fins, thereby providing an efficient and time-saving operation.

Another object is to provide an improved method, as aforesaid, for receiving, collecting, transporting and discharging fins as formed on a conventional ribbon-type fin forming machine, which method can be carried out automatically at a high rate of speed consistent with the continuous operation of the fin forming machine while simultaneously enabling the collected stacks of fins to be efficiently and safely transported to and discharged at a further work location, thereby providing a method having vastly improved accuracy and efficiency in contrast to prior known techniques.

Still another object is to provide an improved fin supporting structure in association with a ribbon-type machine, which fin supporting structure is particularly desirable when used in combination with the aforesaid apparatus and method of this invention, and which fin supporting structure permits the plurality of fins as formed during each cycle of the machine to be securely and accurately held in proper orientation and then efficiently and rapidly discharge downwardly in the necessary aligned relationship for deposit on the fin stacking structure located therebelow.

Other objects and purposes of the invention will be apparent to persons familiar with apparatus and methods of this general type upon reading the following specification and inspecting the accompanying drawings.

BRIEF DESCRIPTION OF THE DRAWINGS

FIG. 1 is a perspective view illustrating, in general, the improved apparatus of this invention used in conjunction with a conventional ribbon-type fin forming line.

FIG. 2 is a diagrammatic, side elevational view of the ribbon-type fin forming machine and its relationship to the endless fin collector of this invention.

FIG. 3 diagrammatically illustrates the side-by-side positional relationship of a plurality of fins as formed during each operational cycle of the ribbon-type fin line.

FIG. 4 is an enlarged, cross sectional view through the improved fin supporting head of the fin forming machine.

FIG. 5 is a fragmentary sectional view taken along line V—V in FIG. 4.

FIGS. 6A and 6B are a side elevational view, partially in cross section, of the improved apparatus, with FIG. 6A illustrating the discharge end of the endless fin collector in conjunction with a fin removal device, and FIG. 6B illustrating the opposite end of the endless fin collector.

Figure 6A:
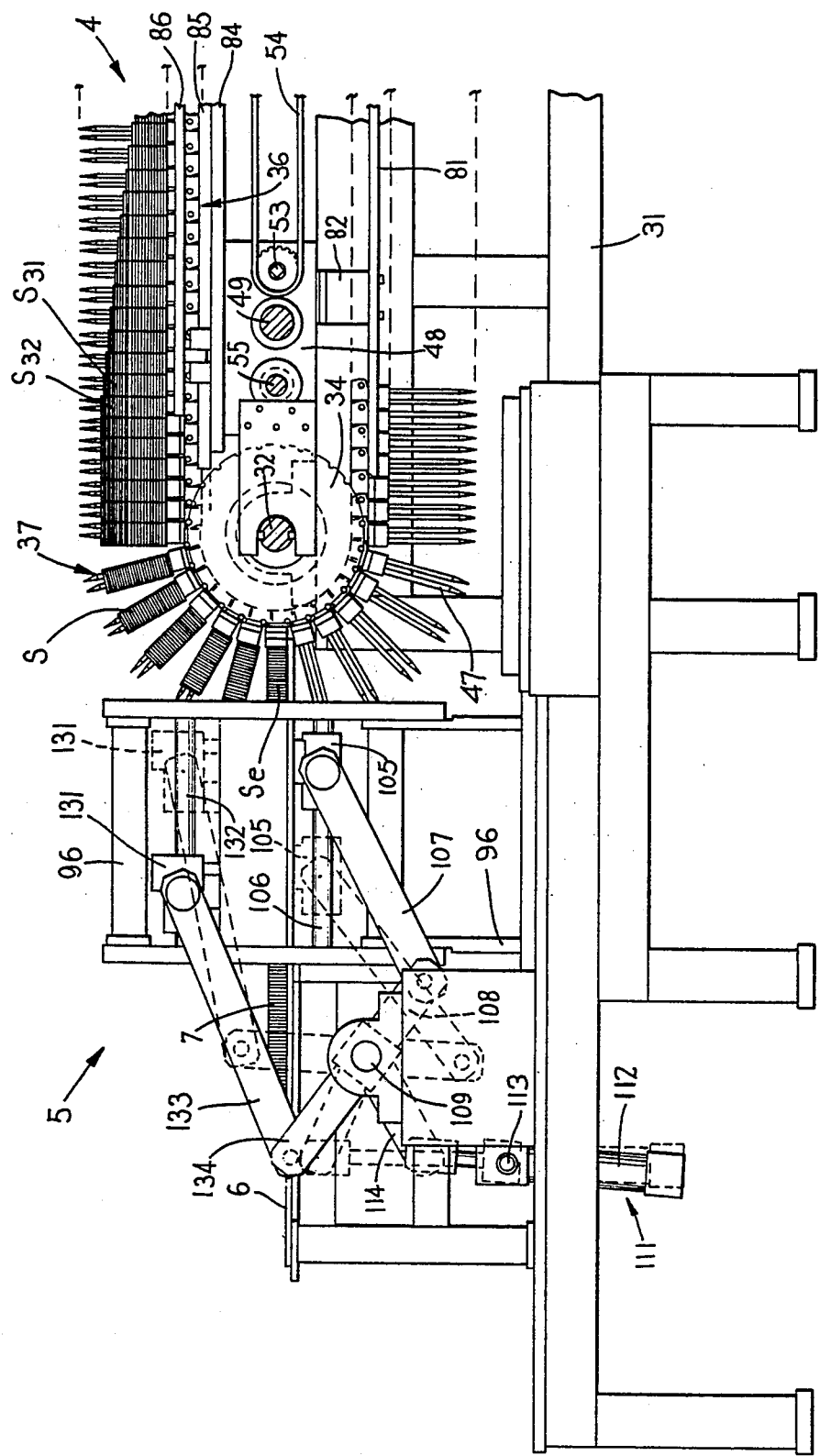

Certain terminology will be used in the following description for convenience in reference only and will not be limiting. For example, the words "rightwardly", "leftwardly", "upwardly" and "downwardly" will refer to direction in the drawings to which reference is made. The word "forwardly" will refer to the normal direction through which the fin and related conveying and transporting apparatus is moved as the fin is moved away from the fin forming line toward the next work station. The words "inwardly" and "outwardly" will refer to directions toward and away from, respectively, the geometric center of the apparatus and designated parts thereof. Said terminology will include the words specifically mentioned, derivatives thereof and words of similar import.

DETAILED DESCRIPTION

FIGS. 1 and 2 illustrate therein a system 2 for forming, collecting, transporting and discharge fins according to the present invention. This system includes a conventional ribbon-type fin forming line 3 which simultaneously forms a plurality of rectangular fins from sheet material, with the fins being collected in stacks S on an endless fin collector 4. The fin stacks S are then transported to a discharge or removal device 5 which removes the fin stacks from the collector and deposits same on a pair of opposed fin collecting rails 6 on which a column of fins 7 are slidably displaced toward the next working station.

The fin line 3 is of a conventional and well-known construction, and is thus only diagrammatically illustrated in FIGS. 1 and 2. This line 3 is supplied with sheet material 8, commonly referred to as a ribbon, from a roll 9. The ribbon 8 is fed through a fin forming machine 10 where it is punched to form the desired holes or apertures therethrough, and is then fed horizontally between opposed upper and lower platens 11 and 12. These platens have suitable dies thereon such that, when the upper platen is moved downwardly, these dies cooperate to cut the ribbon along several parallel lines which extend longitudinally of the ribbon, thereby forming a plurality of equal width, side-by-side strips which project longitudinally of the ribbon. These strips project outwardly above the lower platen 12 and are engaged by a reciprocal drive plate 13 which has projecting retractable drive fingers which engage the apertures in the strips. This plate 13 is reciprocated by a crank 14 secured to a drive shaft 15, the latter being driven from the machine power source. This drive arrangement causes the complete ribbon to be horizontally fed through the machine 10 in an intermittent steplike manner. The projecting strips, after passing over the drive plate 13, pass through a cutoff mechanism 16 so that the strips then project under a fin supporting structure 17.

The fin supporting structure 17, conventionally referred to as a suction head, includes a lower horizontal support plate 18 provided with rows of small apertures or holes 19 therethrough. The rows of apertures are positioned to extend substantially along the lengthwise edges of the metal strips which are positioned directly beneath the plate 18. These apertures 19 communicate with an interior suction chamber 21, which in turn communicates with a suction fan 22 driven from a motor 23. This arrangement creates a suction within chamber 21 so that air flows upwardly through the apertures, thereby holding the metal strips against the undersurface of plate 18. After the strips have been fed outwardly beneath the plate 18, then cutoff device 16 is actuated in a conventional manner to sever the free ends of the strips from the continuous ribbon which extends through the machine 10, which severed strips now form the completed fins F, which fins are held in side-by-side relationship adjacent the undersurface of the plate 18.

The above-described structure is well known so that further detailed description thereof is not believed necessary.

The fin supporting structure 17 also has an improved fin discharge assist means 24 associated therewith, which assist means 24 will be described hereinafter.

Considering now the endless fin collector 4, same includes a frame 31 on which is rotatably supported front and rear sprocket shafts 32 and 33, respectively. These shafts extend horizontally in parallel relationship and have front and rear sprocket pairs 34 and 35 nonrotatably connected thereto. These sprocket pairs in turn support and drivingly engage an endless chainlike conveying means 36 having outwardly projecting fin supporting means 37 fixed thereto at regularly spaced intervals therealong. The endless conveying means 36 is disposed with at least a straight upper reach extending substantially horizontally, and positioned so as to move perpendicularly with respect to the horizontal direction of movement of the fins as discharged from the fin line 3.

Figure 7:
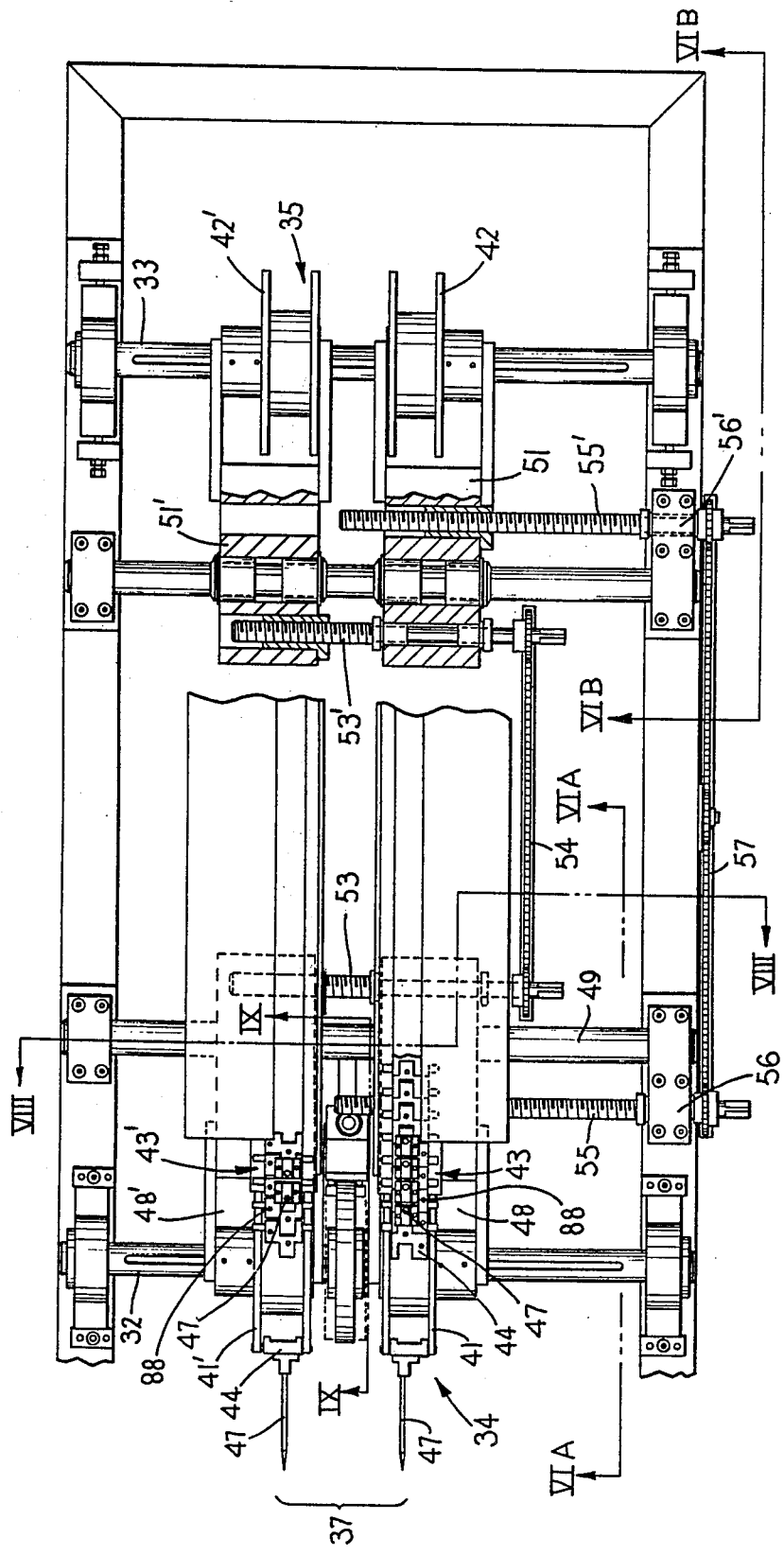
FIG. 7 is a plan view of the endless fin collector, same being illustrated with the fins removed and partially in cross section for purposes of illustration.

As illustrated in FIG. 7, the front sprocket pair 34 is formed by identical axially-spaced sprocket wheels 41-41', and the rear sprocket pair 35 is similarly formed by identical axially-spaced sprocket wheels 42-42'. The endless conveying means 36 comprises a pair of substantially identical endless chainlike members 43-43' which respectively extend between and are supported on the pairs of sprocket wheel 41-42 and 41'-42'.

Each endless member 43-43' is formed from a plurality of substantially identical links 44 which are pivotally connected together and each of which has sprocket rollers 45 projecting outwardly from opposite sides thereof. A stacker block 46 is fixed to each link 44, and each block 46 has an elongated rod or spike 47 fixed thereto and projecting perpendicularly outwardly therefrom, which spike terminates in a tapered or pointed end. The spikes 47 on conveying member 43-43' form cooperative pairs so as to stably support thereon a stack S of apertured fins F. The cooperative pair of spikes includes one spike on the chain 43 and a further spike on the chain 43', which two spikes are substantially transversely aligned with one another when viewed from the side of the endless chain. However, the cooperative pair of spikes are slightly offset from one another in the direction of movement of the chain so as to accommodate the staggered relationship of the apertures formed in the fins F. This cooperative pair of sidewardly displaced spikes defines the aforementioned fin supporting means 37.

The sprocket wheels may be adjustable to provide the desired relationship of the conveyor to the fin line; and the specific fin geometry. For this purpose the sprocket wheels 41-41' are rotatably supported on adjustment blocks 48-48' which in turn are rotatably and axially slidably supported on a guide rod 49 which extends parallel to the front sprocket shaft 32. Similar adjustment blocks 51-51' have the sprocket wheels 42-42' rotatably supported relative thereto, with these adjustment blocks being rotatably and axially slidably supported on a further guide rod 52 which extends parallel to the rear sprocket shaft 33. A threaded adjustment screw 53 is rotatably supported on the adjustment block 48 and is threadably connected to the opposite adjustment block 48'. A similar threaded adjustment screw 53' is rotatably supported on block 51 and threadably engaged with block 51'. These parallel adjustment screws 53 and 53' have sprockets on the outer ends thereof which are joined by an endless chain 54. By manually rotating one of the shafts 53 or 53', as by means of a wrench, both shafts are rotated in the same direction so that the adjustment blocks 48' and 51', together with the sprocket wheels 41'-42' mounted thereon, are slidably moved axially away from or toward the opposed adjustment blocks 48 and 51. This thus permits the spacing between the cooperating pairs of sprocket wheels, and hence the spacing between the chains 43-43', to be adjusted.

The four sprocket wheels can also be adjusted sidewardly as a unit relative to the stationary frame. This may be provided by means of parallel threaded adjustment screws 55-55' which are threadably engaged with adjustment blocks 48-51 respectively. The outer ends of screws 55-55' are rotatably supported in bearings 56-56' secured to the frame. Appropriate sprockets are nonrotatably secured to the outer free ends of the shafts 55-55', which sprockets are joined by an endless chain 57 so that the screws 55-55' are simultaneously rotatable in the same direction. Manual rotation of one of these screw shafts 55-55', as by means of a wrench, will cause all of the adjustment blocks and hence all of the chain sprocket wheels to be moved sidewardly as a unit so that the conveyor chains 43-43' can be positioned as desired with respect to the suction head 17.

The endless conveying members 43-43' are driven by any suitable indexing drive unit to cause the chains to be intermittently moved in a steplike manner through distances of uniform predetermined length, which length equals the centerline-to-centerline spacing between the adjacent fins as held beneath the suction head 17. This indexing drive means is normally connected to one of the sprocket shafts 32-33, and the drive means itself may assume many different conventional forms, involving either rotary or linear drive motors coupled with appropriate control structure for insuring that the indexing occurs at proper intervals and through proper distances.

Figure 9:
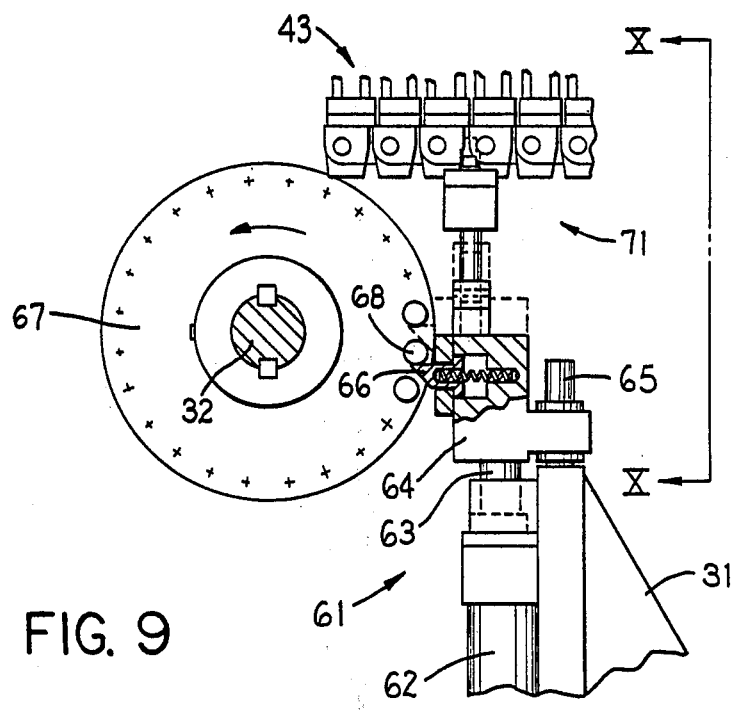
FIG. 9 is a fragmentary sectional view taken along line IX—IX in FIG. 7.

The illustrated embodiment has the endless chains 43-43' intermittently driven in a steplike manner by the indexing drive means 61 as illustrated in FIG. 9. This drive means includes a double-acting fluid pressure cylinder 62 which is fixed to the conveyor frame 31 and has an upwardly projecting piston rod 63 secured to a vertically movable drive block 64. This block, which is slidably guided by the pin 65, is provided with a driving pawl 66 projecting sidewardly therefrom, which pawl is springed urged outwardly. Pawl 66 is disposed to drivingly engage a pin wheel 67 which is nonrotatably secured to the front sprocket shaft 32 and is disposed axially between the sprocket wheels 41 and 41'. When cylinder 62 is energized to move the drive block 64 upwardly, the pawl 66 engages a pin 68 on wheel 67 to rotate the pin wheel and hence the sprocket wheels through a predetermined angular extent. When the piston rod is moved downwardly, the lower tapered surface on the pawl 66 causes it to be cammed inwardly to thereby pass over the pin and hence cause no reverse rotation of the pin wheel.

Figure 10:
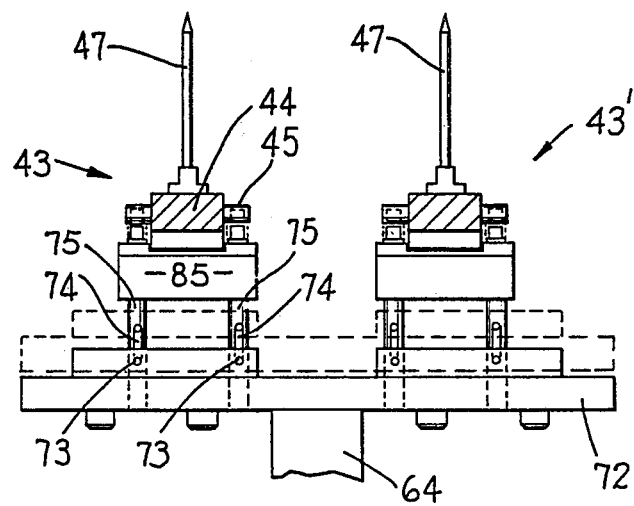
FIG. 10 is a fragmentary view taken along line X—X in FIG. 9.
Figure 11:
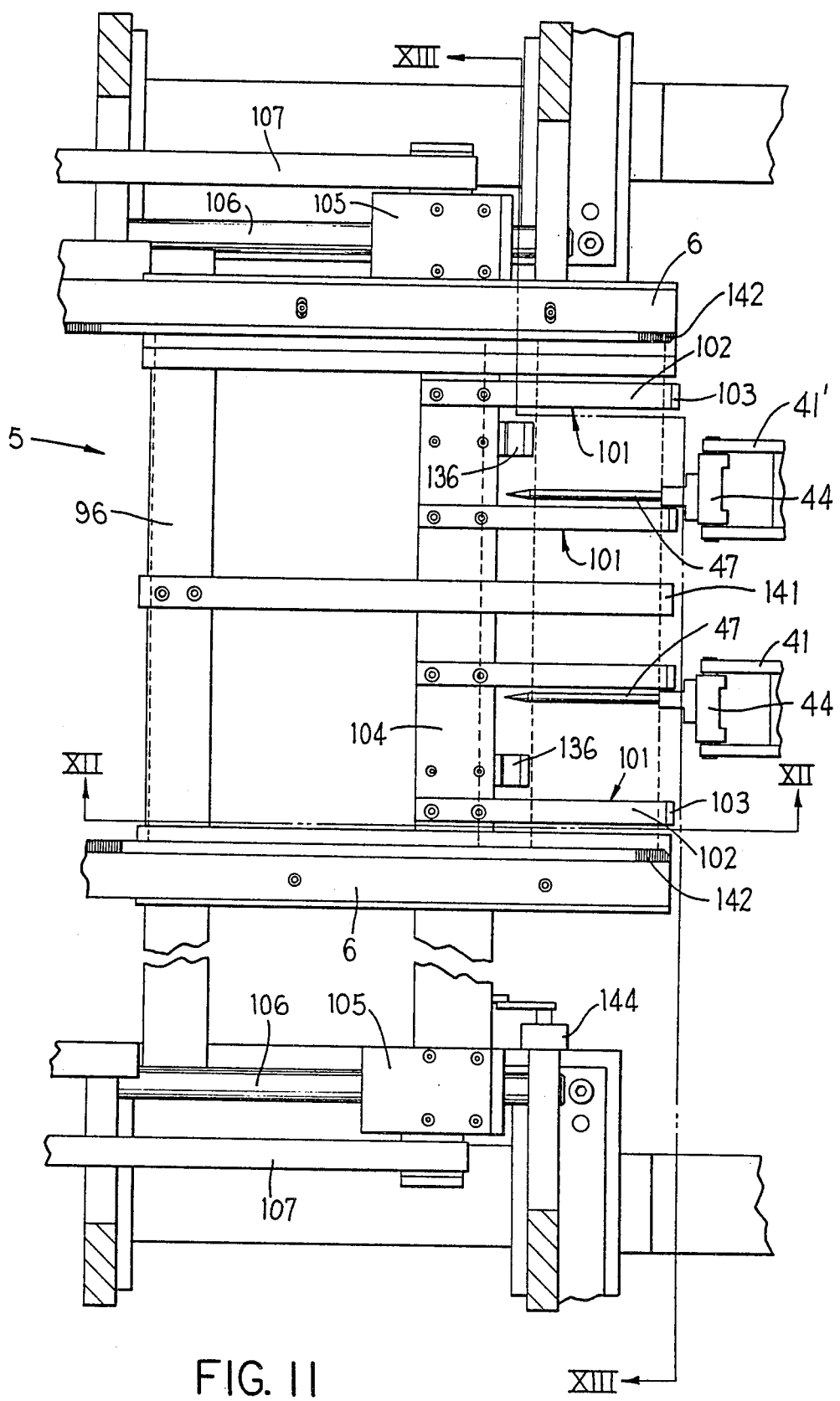
FIG. 11 is a fragmentary plan view of the fin removal device positioned adjacent the discharge end of the fin collector, as taken substantially along line XI—XI in FIG. 12.

The indexing drive means 61 also has a holding or brake device 71 associated therewith and engageable with the chains 43-43' to positively stop and hold the chains after they have been advanced the desired steplike distance. This brake device 71, as illustrated in FIGS. 9 and 10, includes an elongated crossbar 72 which is fixed to the drive block 64 and extends horizontally across the distance between the two chains below the horizontal upper reaches thereof. Mounted on each end of the crossbar 72, directly below the horizontal reach of each chain, is a pair of parallel actuator pins 73 which extend through vertically elongated slots 74 formed in a pair of cooperating brake pins 75 which are vertically slidably supported on a stationary guide rail 85 to be explained hereinafter. The upper ends of brake pins 75 are normally maintained in a lowermost position as illustrated, wherein they do not interfere with the advancing movement of the chain. When cylinder 62 is energized to move the drive block 64 upwardly, the initial upward lifting causes the pawl 66 to rotate the pin wheel 67 and the actuator pins 73 slide upwardly until they engage the upper ends of slots 74, whereupon further upward lifting causes the brake pins 75 to be lifted upwardly so that the upper ends thereof project upwardly a sufficient distance as to be positioned directly in front of the sprocket rollers 45 as associated with one of the chain links 44, thereby positively stopping the chain and preventing further advancing thereof, such as due to inertia.

Figure 8:
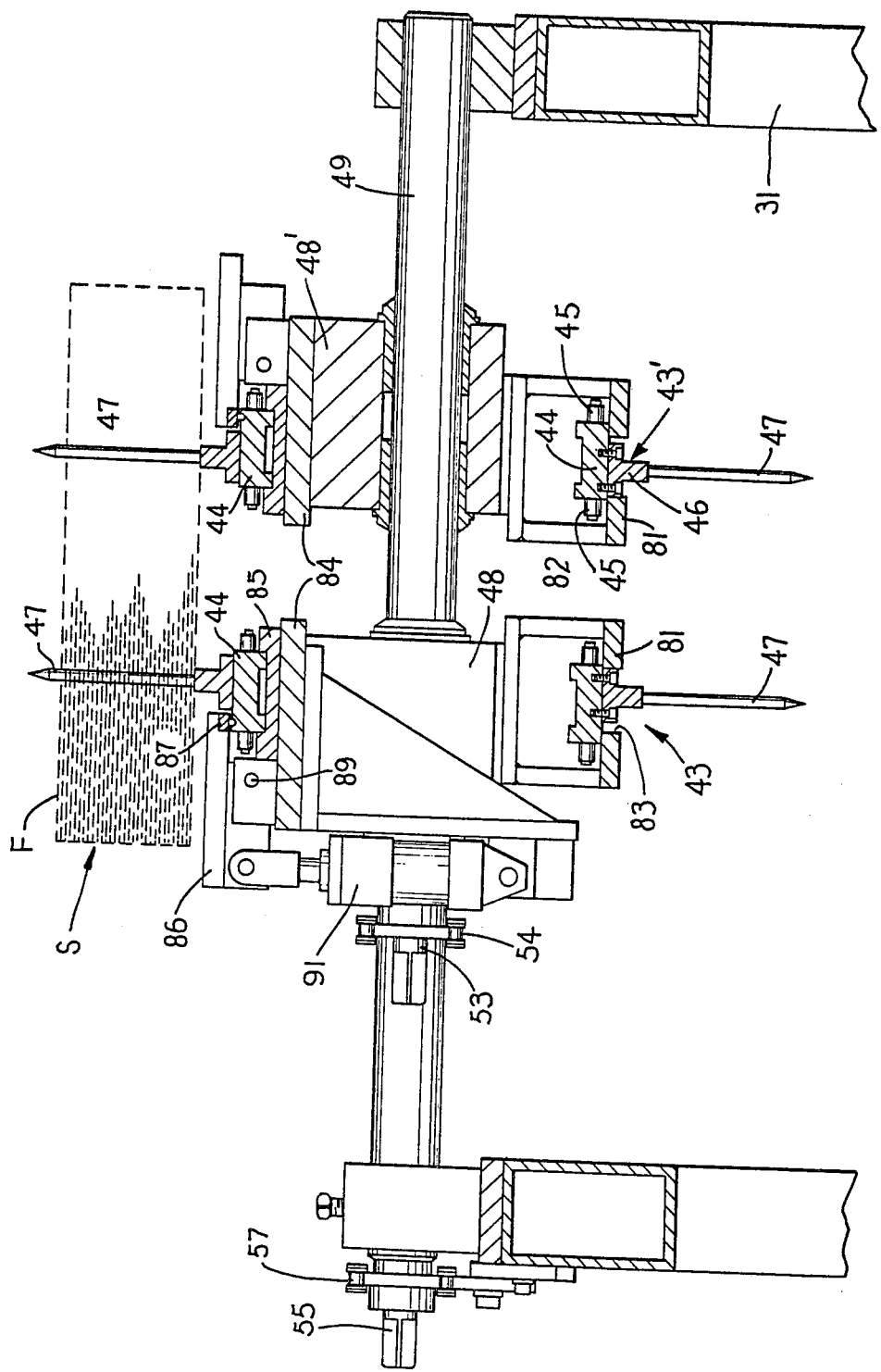
FIG. 8 is a fragmentary sectional view taken along line VIII—VIII of FIG. 7.

To insure proper guiding of the chains 43-43' and prevent undesired drooping of the upper and lower reaches as they extend between the sprockets, there is provided appropriate slide rails for engaging both the upper and lower chain reaches. More specifically, as illustrated in FIG. 8, a pair of parallel bottom guide rails 81 extend between the pairs of adjustment blocks 48-51 and 48'-51', which guide rails are fixed to the blocks by downwardly opening channel-like brackets 82. These guide rails define longitudinally extending, downwardly opening slots 83 through which project the spikes 47 associated with the lower reach of the endless chains.

A further pair of parallel, elongated guide plates 84 extend between and are fixedly connected to the pairs of adjustment blocks 48-51 and 48'-51'. These guide plates 84 have upwardly opening channel-like guide rails 85 fixed thereto and extending longitudinally therealong. These guide channels 85 slidably guide the links 44 of the chains 43-43' for longitudinal movement therealong, and additionally prevent sideward displacement of the upper reaches of the chains. There is also provided a top hold-down rail 86 associated with the upper reach of each conveyor chain, which hold-down rail has a row of balls 87 captive therein. These balls 87 are spaced longitudinally along the upper chain reach at intervals equal to the spacing of adjacent chain links 44, so that one ball 87 will thus be positionable for engagement with a small detent or recess 88 as formed in the upper surface of each chain link 44. The hold-down rail 86 is horizontally pivoted at 89, and the outer end of this rail is connected to the piston rod of a conventional double-acting fluid pressure cylinder 91 which, when energized to cause the piston rod to move upwardly, causes pivoting of the rail 86 so that the balls 87 move into the detents 88 and thereby securely and stationarily hold the upper reach of the chains.

Considering now the fin discharge device 5, same is disposed adjacent and substantially aligned with one end of the endless collector 4 for discharging the fin stacks S therefrom.

The fin discharge device 5, as shown in FIGS. 6A and 11-13, includes a stationary frame 96 having a fin removal mechanism 97 for removing the fin stacks S from the conveyor at that position wherein the spikes 47 project substantially horizontally. The removed stack S is then engaged by an advancing mechanism 98 and is moved forwardly in the same direction through a further predetermined distance, whereupon the fins are thus stackingly held in a horizontally extending column 7 while being supported on the opposed L-shaped guide rails 6.

Considering first the fin removal mechanim 97, same includes a plurality of L-shaped rakes 101 positioned in spaced relationship across the width of the frame. Each rake 101 includes a substantially horizontal base plate 102 which, at its free end, is provided with a fixed upwardly projecting pusher plate 103. The other end of horizontal plates 102 are fixed to a movable cross bar 104 which extends horizontally transversely across the frame and is secured to a pair of slides 105, which slides in turn are slidably supported on a pair of parallel guide rods 106. These rods 106 extend horizontally in parallel relationship to the discharge direction of the fin stacks S. The slides 105 are connected to elongated connecting rods 107 which, at their other ends, are connected to the outer end of an oscillating crank arm 108, which in turn is secured to an oscillating drive shaft 109.

The shaft 109, and hence the arm 108, is angularly oscillated by a drive unit 111 which, in the illustrated embodiment, includes a double-acting pressure cylinder 112 which is pivotally supported at 113 on the frame and has the piston rod thereof hingedly connected to the outer end of lever 114, the latter being fixed to the shaft 109.

The arm 108 is drivingly oscillated through a small angular extent whereby the slides 105 are reciprocated between the two positions illustrated in FIG. 6A. With the slides 105 in their rearwardmost position indicated by solid lines in FIG. 6A, the rakes 101 project outwardly between the horizontally projecting spikes 47 so that pusher plates 103 are disposed between the two chains 43-43' adjacent the base of the spikes. The pusher plates are thus disposed inwardly of the lowermost fin contained within the stack $S_e$. Actuation of the fin removal mechanism 97 so as to cause the slides 105 to move into the dotted position (FIG. 6A) causes the rakes 101 to be pulled (leftwardly in FIG. 12) through a distance such that the pusher plates 103 just pass beyond the pointed ends of the spikes 47, thereby causing the stack $S_e$ to be totally removed from the spikes and supported on the opposed L-shaped guide rails 64.

The discharged stack S is then engaged by the fin advancing mechanism 98 which includes a plurality of spaced, coplanar pusher plates 115. These plates 115, which have recesses 125 for permitting the pusher plates 103 to pass therethrough, are fixed to a movable crossbar 116 which extends transversely and has guide rollers 117 mounted on opposite ends thereof. These rollers are rollingly supported within horizontally elongated slots 118 defined between elongated guide rails 119-120, which are fixed to stationary side frames 122. A further guide rail 121 is spaced upwardly and extends parallel to the rail 119 so as to define a further elongated guide slot 123 therebetween. The centermost rail 119 is of shorter length and effectively terminates in a camming lever 124 which is pivoted at 126, being urged downwardly against the lower rail 120 by its own weight. This lever 124 has an upper camming surface 127 for permitting the roller 117 to roll upwardly therealong into the upper slot 123 as explained hereinafter.

The opposite ends of the movable crossbar 116 have vertical guide rods 128 fixed thereto and projecting upwardly therefrom. These rods are slidably positioned with ball-slide guides 129 which are fixed to slide blocks 131. These blocks are slidably supported on a pair of horizontally extending stationary guide rods 132 which are spaced upwardly and extend parallel to the lower guide rods 106.

The upper slides 131 are connected to elongated connecting rods 133 which in turn are pivotally connected to the free ends of oscillating crank arms 134, the latter being secured to the oscillating drive shaft 109.

As illustrated in FIG. 6A, the crank arms 108 and 134 project radially outwardly in opposite directions from the drive shaft 109, with the arm 134 being longer than the arm 108 so that the stroke of the upper slides 131 is greater than the stroke of the lower slides 105. The arms 108 and 134, in the illustrated embodiment, are formed integrally as a single lever member, although separate arms could be utilized if desired.

To prevent the frontmost fin in the stack $S_e$ from falling over as the stack is being removed from the spikes 47 by the rakes 101, these rakes have a pair of fin supporting plates 136 movably mounted on the crossbar 104 and projecting vertically upwardly therefrom. These plates 136 are connected to the upper ends of piston rods 137 associated with small pneumatic control cylinders 138 which are stationarily mounted to and project downwardly from the crossbar 104. The plates 136 are movable between a lower position wherein they permit the fin stack to pass thereover, and an upper position wherein they project upwardly for engagement with the frontmost fin of the stack. The supporting plates 136 are spaced from the rake pusher plates 103 by a distance slightly greater than the height of the stack $S_e$ so as to permit the latter to be positioned therebetween.

The fin stacks supported on the guide rails 6, particularly at the inlet end (rightward end in FIG. 12) of the device, are additionally supported by an intermediate bottom rail 141 which is positioned between the rakes 101 and is disposed substantially coplanar with the horizontal legs 102 thereof. Further, the vertical legs of the L-shaped guide rails 6 have a brushlike structure 142 secured thereto and extending longitudinally therealong. These brush structures are sufficiently deformable as to enable a gripping and holding of the side edges of the fins, particularly when the stack is being pushed forwardly along the rails, so as to prevent the individual fins from falling over.

Considering now the discharge means 24 associated with the suction head 17, and referring specifically to FIG. 4, same includes structure for creating a downwardly directed air blast to thereby assist in forcing the fins to move downwardly away from the suction plate 18 for deposit on the spikes 47. The suction plate 18 has a pair of stationary guides 151 fixed thereto and positioned within the suction chamber 21. These guides extend parallel to one another in perpendicular relationship to the elongated direction of the fins. Each of these guides has an elongated conduit or passage 152 formed therein, which passages 152 are connected to a source of pressurized air, with flow of air to said passages being controlled by a suitable solenoid valve (not shown). These passages 152 each communicate with a plurality of small air jets or holes 153 which extend downwardly through the suction plate 18 and are disposed within an elongated row. Each of the holes 153 is positioned so as to be effectively covered by one of the fins.

In addition to the air blast structure described above, the suction head 17 also has mechanical alignment structure associated therewith for insuring that the fins, when discharged from the suction plate, are properly aligned with the underlying spikes 47. This mechanical alignment structure includes a plurality of downwardly projecting pins 155 which are slidably supported within appropriate holes formed in the guides 151 and the underlying suction plate 18. These pins 155 are disposed within two elongated, substantially parallel rows which extend transversely of the suction head, with the pins being fixed to a rigid yoke 156 which is positioned above the guides 151. A small double-acting pneumatic pressure cylinder 157 is connected between the suction plate 19 and the yoke 156 for causing vertical reciprocation of the latter between a raised position (not shown) wherein the lower tapered ends of the pins are withdrawn into the suction plate, and a lowered position wherein these pins project downwardly below the suction plate. The guide pins 155 are disposed directly aove and substantially aligned with the underlying spikes 47, and movement of these pins 155 into their lower position results in the free ends of the pins 155 being positioned closely adjacent but slightly upwardly from the free ends of the spikes. When the pins 155 are moved downwardly, they penetrate appropriate apertures which exist in the fins and cause the fins to be properly guided when they are dropped downwardly onto the spikes. Further, in some instances the fins do not move forwardly a sufficient extent when being fed from the press onto the suction head. In this instance, the tapered lower ends of pins 155 coact with apertures in the fin to cause a slight forward camming of the fins substantially instantaneously with the release of the fins, to thereby insure the proper alignment and deposit of the fins on the spikes.

OPERATION

The operation of the endless collector 4, and its relationship to the fin line 3, will be initially considered.

The ribbon or sheet material 8 is fed into the machine or press 10 and between the relatively movable platens which, when actuated, form a plurality of identical apertured strips which project forwardly of the machine in side-by-side relationship. The machine 10, as disclosed, is capable of simultaneously forming thirty-two strips in side-by-side relationship. The strips are moved forwardly under the suction plate 18 directly over the upper reach of the endless conveyor, whereupon cutter 16 is actuated to sever the fins F from the projecting strips, the fins then being held against the suction plate. The upper conveyor reach has thirty-two receiving stations positioned thereon in adjacent side-by-side relationship along the longitudinal length of the endless conveyor, which stations are positioned directly under and in alignment with the thirty-two fins held against the suction plate 18. Each said station is formed by a pair of upwardly projecting spikes 47, one of which is secured to each chain 43-43'. The pair of spikes associated with each station has, or is adapted to have, a partial stack of fins supported thereon, which fin stacks are designated $S_1$ through $S_{32}$. When so positioned, the suction above plate 18 is terminated so that the fins move downwardly for deposit on the pair of spikes 47 located directly therebeneath, which spikes pass through a pair of apertures in the fin, such as the apertures A and A' illustrated in FIG. 3.

Simultaneous with the termination of the suction above the plate 18, which is effected by opening a damper plate provided on the housing defining the suction chamber, the valves which control the supply of pressurized air to the passages 152 and pressure cylinder 157 are opened. This supplies pressurized air to cylinder 157 so that the alignment pins 155 are projected downwardly below the suction plate 18, thereby insuring proper alignment of the fins for deposit on the spikes. At substantially the same time, pressurized air supplied through passages 152 is jetted downwardly through the holes 153 so as to impinge on the fins, thereby assisting the effect of gravity and forcing the fins downwardly for reception on the spikes.

After depositing of the fins on the spikes, the endless conveyor is energized and moved forward through a distance equal to the centerline-to-centerline spacing between adjacent fins, which spacing also equals the spacing between adjacent spike stations. Prior to or substantially simultaneously therewith, the press 10 undergoes a further punching operation to cause formation of a further set of fins, which fins are advanced forwardly and held below the suction plate 18. Thus, when the conveyor completes its incremental advance, whereupon each set of spikes has advanced one station, then a further set of fins are released from the suction plate and deposited on the upwardly projecting spikes. Accordingly, the set of spikes which was initially at station $S_1$ and had a single plate thereon, has now advanced to station $S_2$ and a second plate has been deposited thereon. This intermittent advancing of the conveyor in synchronism with the operation of the fin line 3 continues until the spikes have advanced through all thirty-two stations such that, when reaching station $S_{32}$, the last fin is deposited thereon resulting in thirty-two identical fins being stacked vertically on the pair of spikes at this station. The next advancing movement of the conveyor removes this station from beneath the suction plate so that no further fins are deposited thereon. This stack of fins is then intermittently advanced by the conveyor until reaching the discharge station $S_e$. As the conveyor moves the stack into the discharge station, in which station the spikes project outwardly in substantially horizontal orientation, the stack is effectively positioned on the horizontal base portion 102 of the rakes 101, and is also positioned on the stationary intermediate bottom rail 141 and the stationary collecting rails 6. The stack is held horizontally between the pusher plates 103 and the raised support plates 136. The fin stack $S_e$ is thus positioned for discharge from the conveyor.

The operation of the discharge device 5, and its cooperation with the endless collector 4 will now be described.

Figure 12:
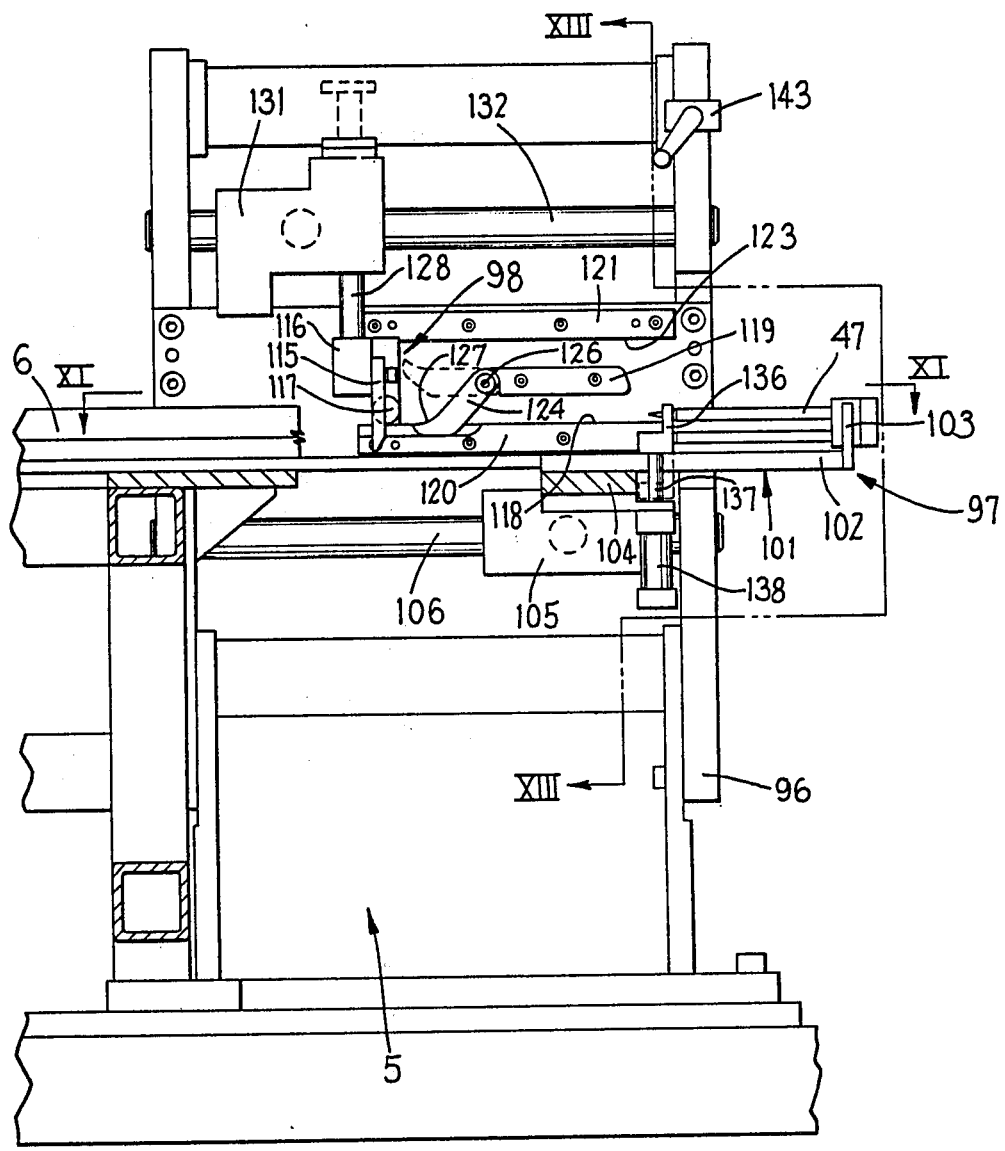
FIG. 12 is a side elevational view of the fin removal device taken partially in cross section substantially along line XII—XII in FIG. 11.
Figure 13:
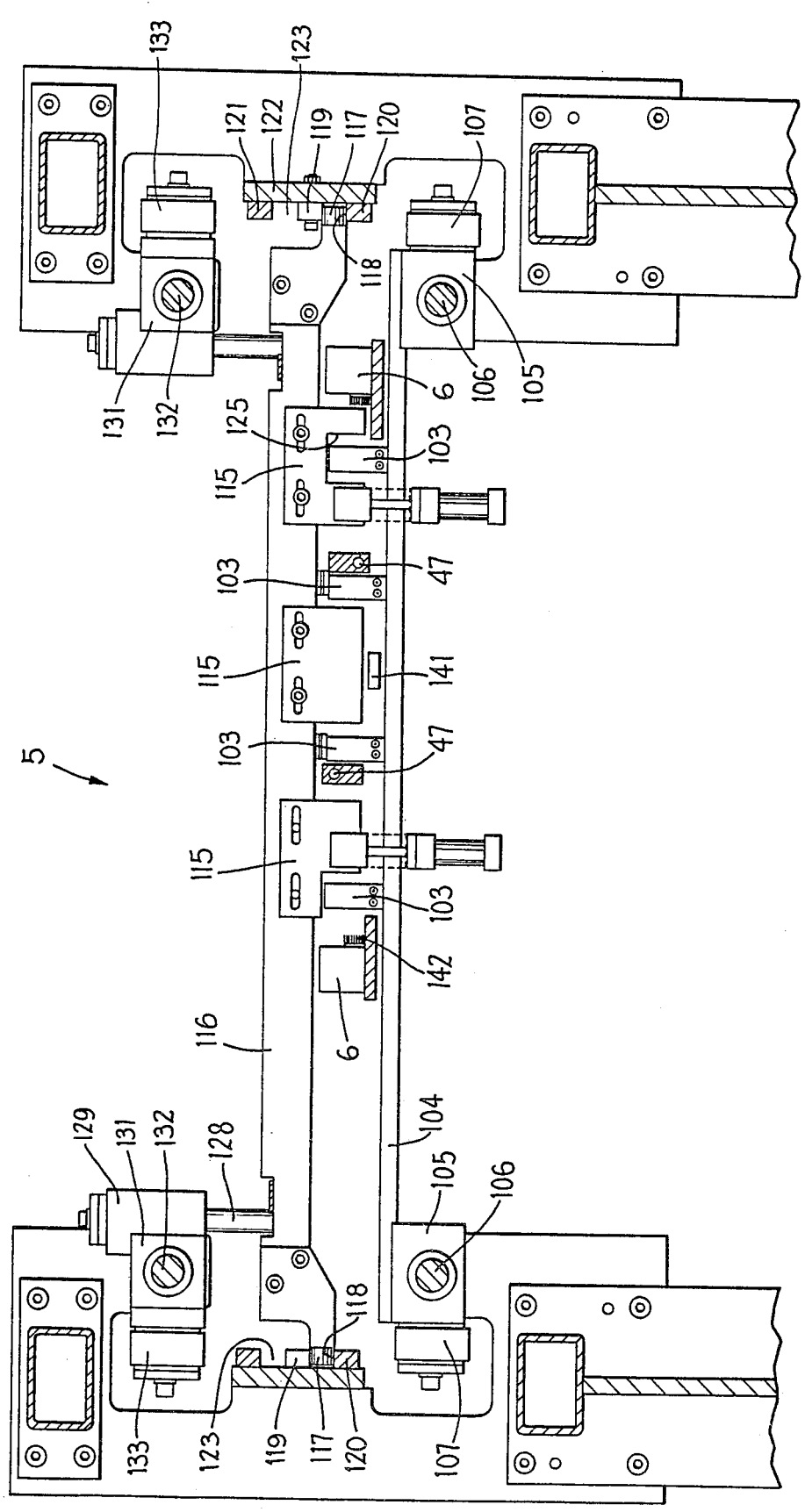
FIG. 13 is a fragmentary sectional view through the fin removal device, substantially along lines XIII—XIII as appearing in FIGS. 11 and 12.

To discharge the fin stack $S_e$ from the endless conveyor, which discharge occurs during the stopped portion of the conveyor cycle, the discharge device 5 is initially in the position illustrated in FIGS. 6A and 12. In this position, the pushing plates 103 associated with rakes 101 are disposed rearwardly behind the inner end of the fin stack $S_e$, whereas the front pusher plates 115 are in their forwardmost position.

The pressure cylinder 112 is energized to cause the crank arm 108 to swing clockwise, thereby causing the slides 105 to move forwardly (leftwardly) whereby rakes 101 are advanced leftwardly to push the fin stack $S_e$ off of the spikes 47 onto the adjacent guide rails 6. The pusher plates 103 advance the stack to a position wherein the pusher plates are disposed just forwardly of the outer ends of the spikes. When reaching this forwardmost position, the front fin supporting plates 136 are lowered so that the fins are supported by the brushes 142.

Simultaneous with the above forward movement of the rakes 101, the other crank arm 134 moves the slides 131 rearwardly which causes the roller 117 to be cammed upwardly by the camming lever 124 into the upper slot 123, thereby raising the pusher plates 115 above the fin stack $S_e$. The continued rearward movement of the slides 131 causes the pusher plates 115 to be moved rearwardly over the top of the fin stack until reaching the end of the slot 123, at which point the center guide rail 119 terminates and the rollers 117 fall downwardly into the lower guide slot 118, which in turn results in the pusher plates 115 being dropped downwardly behind the fin stack $S_e$. When reaching this rearwardmost position, the slides 131 contact the limit switch 143 which signals that the pusher plates 115 have reached the proper rearwardmost position.

Thereafter the pressure cylinder 112 is energized in the opposite direction to cause counterclockwise swinging of the crank arms 108 and 134, whereby slides 105 are moved rearwardly simultaneous with the forward movement of the upper slides 131. Forward movement of slides 131 causes the pusher plates 115 to be forwardly advanced so that the stack $S_e$ is moved along the guide rails 6 through a distance which is slightly greater than the displacement thereof by the rakes 101. As the pusher plates 115 approach the forward end of their stroke, the rollers 117 engage the cam levers 124 and cause them to be momentarily swung upwardly so as to enable the rollers to pass therebelow, following which the cam levers will swingably return to their lower positions.

As the pusher plates 115 start to advance the stack $S_e$, the discharge rakes 101 are simultaneously moved rearwardly, whereupon the pusher plates 103 thus pass through the recesses 125 formed in the pusher plates 115. The rakes 101 are slidably moved rearwardly until they are again positioned so that the pusher plates 103 are disposed adjacent the base of the spikes 47, at which position the slides 105 contact the limit switch 144 which signals the completion of the discharge operation, whereupon the fin supporting plates 136 are again raised into their upper position, and the discharge device is then maintained stationary until a new fin stack is moved into the discharge position of the conveyor.

Thereafter the drive unit associated with the endless conveyor is energized so that the conveyor is again advanced forwardly through the selected distance so that the next set of pins containing thereon a fin stack is advanced into the horizontal discharge position, whereby the discharge device is activated and the above-described cycle is again repeated.

Accordingly, by utilization of appropriate control circuitry which may be of any conventional type, such as limit switches and the like, the intermittent operation of the fin collector 4 and the discharge device 5 are synchronized with the operation of the fin line 3 to thereby permit the substantially continuous and automatic forming, collecting and transporting of large quantities of fins at a rapid rate. While the above description describes the endless fin collector 4 as being intermittently advanced through a distance equal to the centerline-to-centerline spacing between adjacent fins, it will be appreciated that in some instances it will be desirable to intermittently advance the conveyor through a distance equal to a multiple of this centerline-to-centerline spacing, such as intermittently moving the conveyor so that it stationarily stops below every second or third fin as held on the suction head. This type of operation is particularly desirable in situations where the press simultaneously forms several different types of fins during each operation, with the different fins being disposed in a repeating pattern when held on the suction head.

In instances where the fins are manufactured from fairly heavy sheet material, the individual fins will inherently possess sufficient rigidity as to permit total elimination of the suction head. In these cases it is contemplated that the fins can be advanced forwardly of the press and, when severed by the cutting device 16, be deposited directly on the spikes of the conveyor. The endless conveyor could also be moved continuously, rather than intermittently, if desired.

The present invention is applicable with a fin line which forms any desired number of fins during each operation. This invention is also applicable to fins having a wide range of sizes and configurations. For example, the fins could be narrow rectangles or could resemble squares. The fins could also be formed with nonperpendicular corners.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for forming, collecting and transporting platelike fins, such as apertured fins for heat exchangers, comprising the steps of:

supplying a sheet of thin platelike material to a fin forming apparatus;

acting on said sheetlike material with said apparatus to simultaneously form, during each cycle, a plurality of similar platelike fins disposed closely adjacent one another in side-by-side relationship;

holding said plurality of formed fins in a row which is elongated in a direction substantially perpendicular to the elongated dimension of the fins, the fins in said row being disposed in adjacent side-by-side relationship;

providing an endless fin collecting and transporting means having a plurality of outwardly projecting fin supports thereon at uniform intervals therealong, which intervals correspond to the centerline-to-centerline spacing between adjacent fins in said row;

positioning said endless device so that a substantially horizontally extending upper reach thereof is disposed below and extends in a direction substantially parallel with said row;

intermittently moving said endless means in an intermittent steplike manner in synchronism with the cyclic operational rate of said apparatus for causing the upper reach to move stepwise through a predetermined distance along said direction for positioning selected fin supports directly below said row;

releasing said plurality of fins as disposed within said row when said transporting means is stationarily positioned thereunder for causing said plurality of fins to move downwardly and be collected on said endless means by a plurality of said fin supports as disposed adjacent one another;

continuing the intermittent forward advancing of said endless means in synchronization with the forming of fins by said apparatus, and with the release of said fins, so that a stack of fins progressively accumulates at each of said fin supports;

continuing to advance said endless means containing thereon stacks of fins each containing a preselected number until reaching a selected location; and removing each fin stack from said endless means as each said fin stack is moved into said selected location.

2. A method for forming, collecting and transporting platelike fins, such as apertured fins for heat exchangers, comprising the steps of:

supplying a sheet of thin platelike material to a fin forming apparatus;

acting on said sheetlike material with said apparatus to form a plurality of similar platelike fins disposed closely adjacent one another in side-by-side relationship;

holding said plurality of formed fins in a row which is elongated in a direction substantially perpendicular to the elongated dimension of the fins, the fins in said row being disposed in adjacent side-by-side relationship;

providing an endless fin collecting and transporting device having a plurality of outwardly projecting fin supports thereon at uniform intervals therealong;

positioning said endless device so that a substantially horizontally extending reach thereof is disposed below and extends in a direction substantially parallel with said row;

moving said endless device in timed relationship to the operational rate of said apparatus for causing the upper reach to move along said direction for positioning selected fin supports directly below said row;

releasing said plurality of fins as disposed within said row for causing said plurality of fins to move downwardly and be collected on said endless device by a plurality of said fin supports;

continuing the forward advancing movement of said endless device in timed relationship with the forming of fins by said apparatus, and with the release of said fins, so that a stack of fins progressively accumulates at each of said fin supports;

continuing to advance said endless device containing thereon stack of fins each containing a preselected number until reaching a selected location; and removing said fin stacks from said endless device as said fin stacks are moved into said selected location.

* * * * *